J. D. MORGAN.
BOOK OR PAMPHLET MAKING MACHINE.
APPLICATION FILED JULY 14, 1911.

1,021,325.

Patented Mar. 26, 1912.

4 SHEETS—SHEET 1.

Witnesses:
John Darly
Rose Menk

Inventor
John D Morgan

J. D. MORGAN.
BOOK OR PAMPHLET MAKING MACHINE.
APPLICATION FILED JULY 14, 1911.

1,021,325.

Patented Mar. 26, 1912.

4 SHEETS—SHEET 3.

UNITED STATES PATENT OFFICE.

JOHN D. MORGAN, OF SUMMIT, NEW JERSEY, ASSIGNOR TO GOSS PRINTING PRESS COMPANY, OF CHICAGO, ILLINOIS, A CORPORATION OF ILLINOIS.

BOOK OR PAMPHLET MAKING MACHINE.

1,021,325.      Specification of Letters Patent.      Patented Mar. 26, 1912.

Application filed July 14, 1911. Serial No. 638,448.

*To all whom it may concern:*

Be it known that I, JOHN D. MORGAN, a citizen of the United States, residing at Summit, in the county of Union and State of New Jersey, have invented new and useful Improvements in Book or Pamphlet Making Machines, of which the following is a specification.

The invention relates to machine for making magazines or pamphlets, and more especially to machines for trimming the edges of previously stitched and folded pamphlets or magazines.

Objects of the invention are to provide novel mechanism for neatly trimming the front edge of a previously folded pamphlet or magazine; to provide mechanism for trimming the front edge of the folded pamphlet parallel to the back or folded edge; to provide such mechanism adapted to work in a high speed machine; to provide such mechanism adapted to receive the pamphlet from stitching and folding mechanisms which have previously operated thereon; to provide for speedy and accurate trimming and forwarding of the trimmed pamphlets; to provide particular novel mechanisms for effecting the functions described, and such mechanisms as are well or especially adapted to coöperate together to effect such functions. These and other objects of invention are set forth in part hereinafter and in part will be obvious to those skilled in the art.

The invention consists in the novel parts, constructions, combinations, arrangements and improvements herein shown and described.

The accompanying drawings, referred to herein, and forming a part hereof, illustrate one embodiment of the invention, the same serving in connection with the description herein to explain the principles of the invention.

Figure 1:
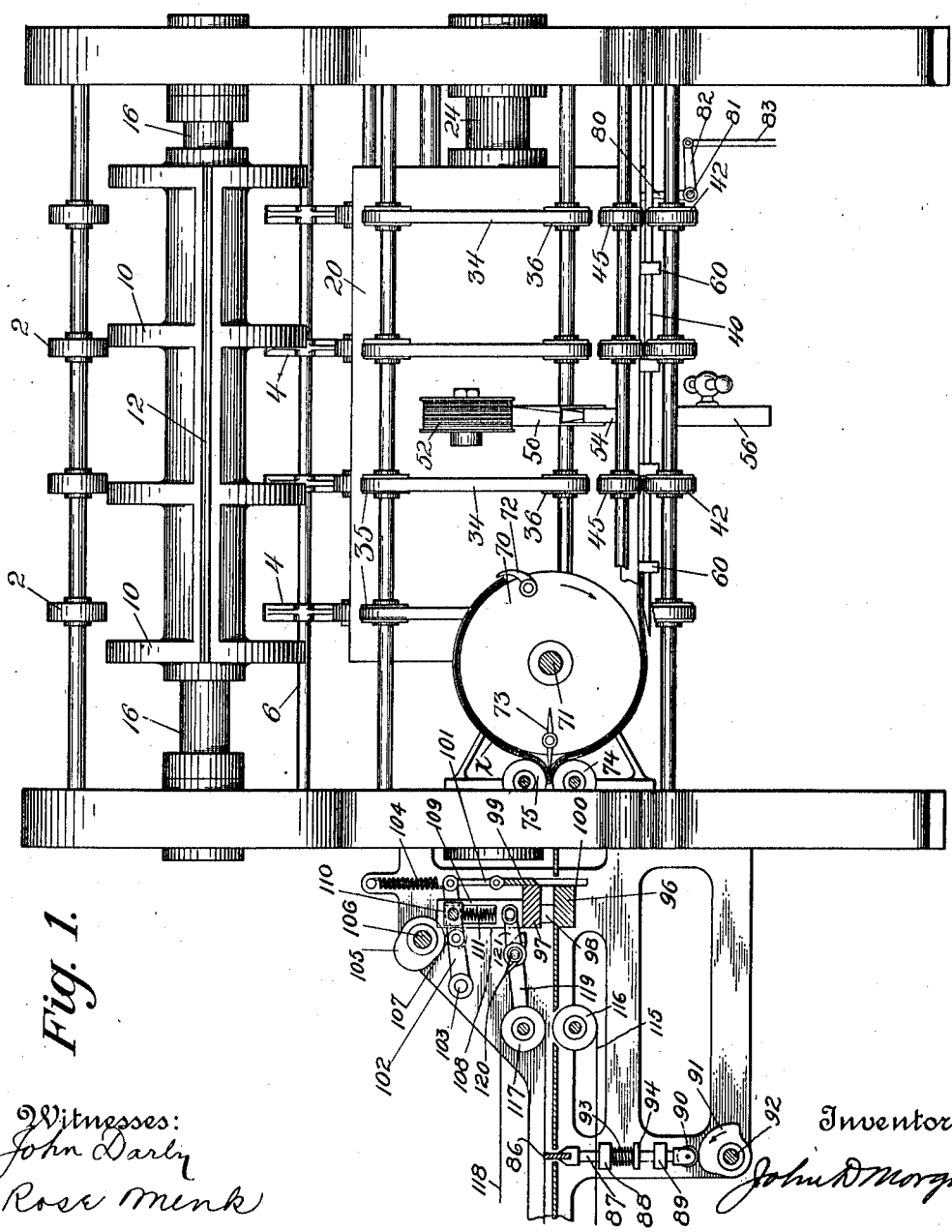
Figure 2:
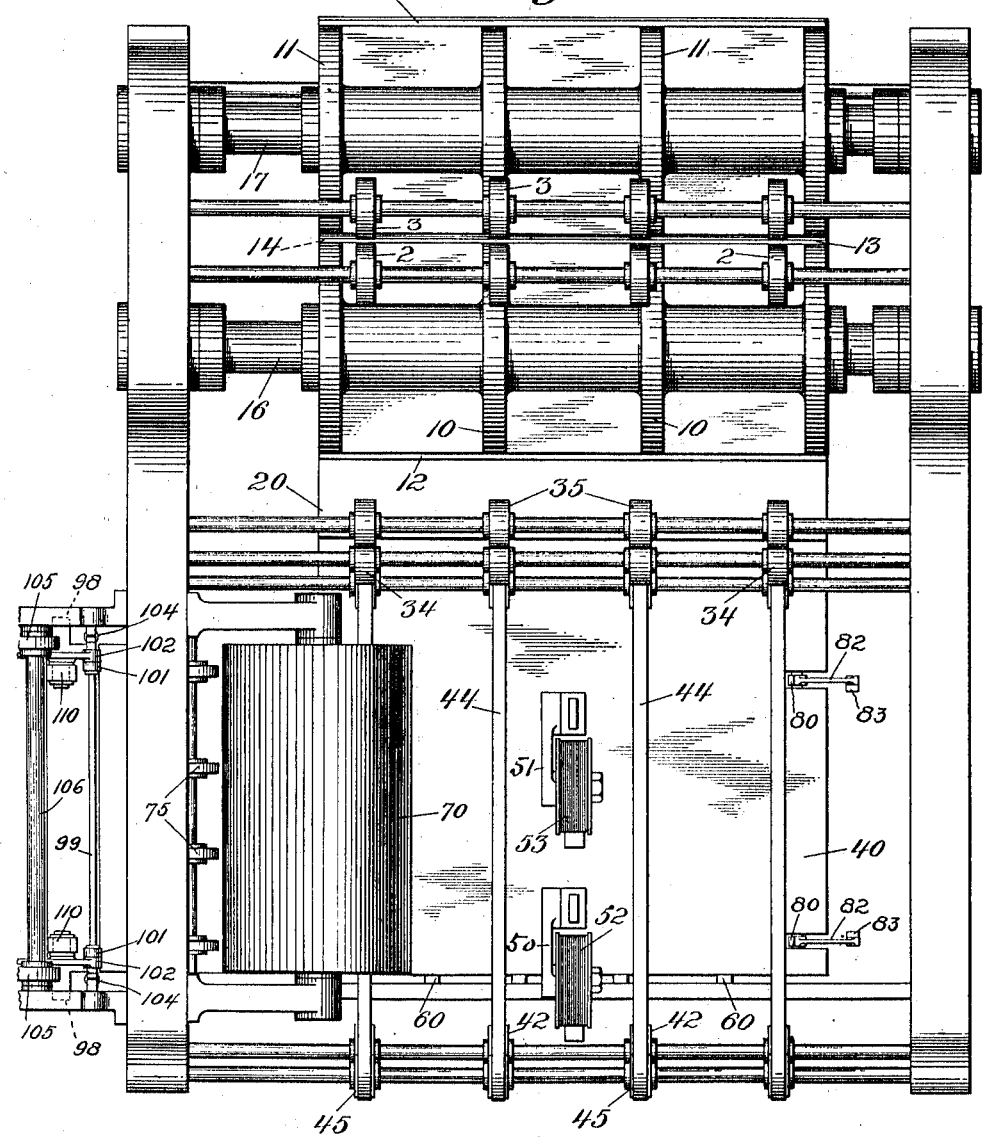
Figure 3:
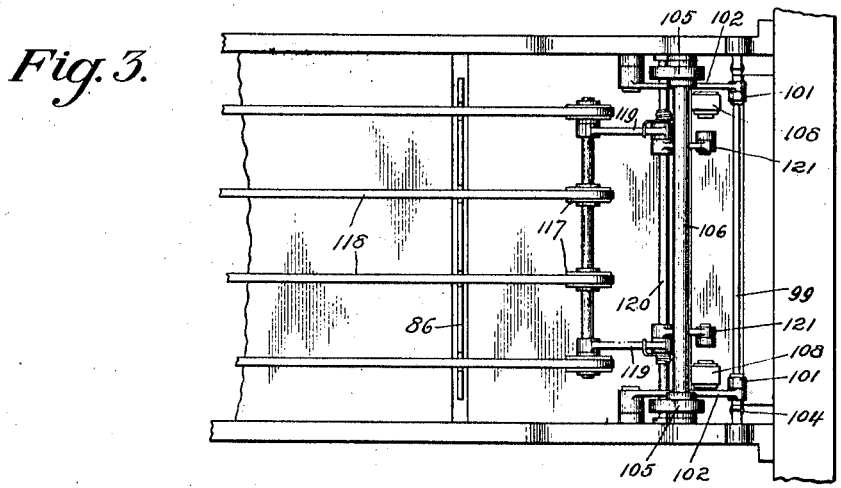
Figure 5:
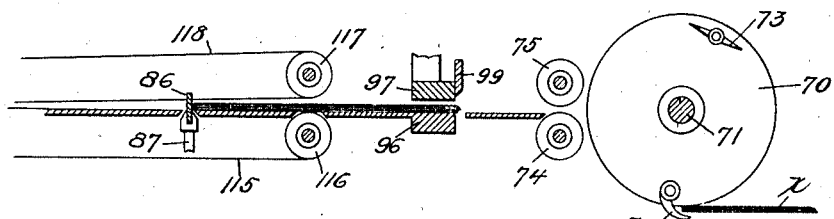
Figure 6:
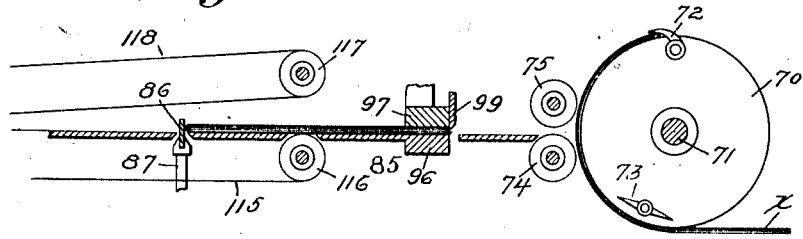
Figure 7:
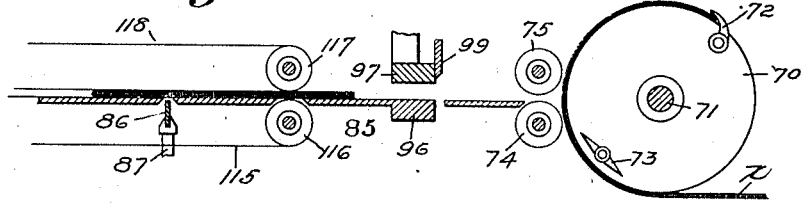
Figure 4:
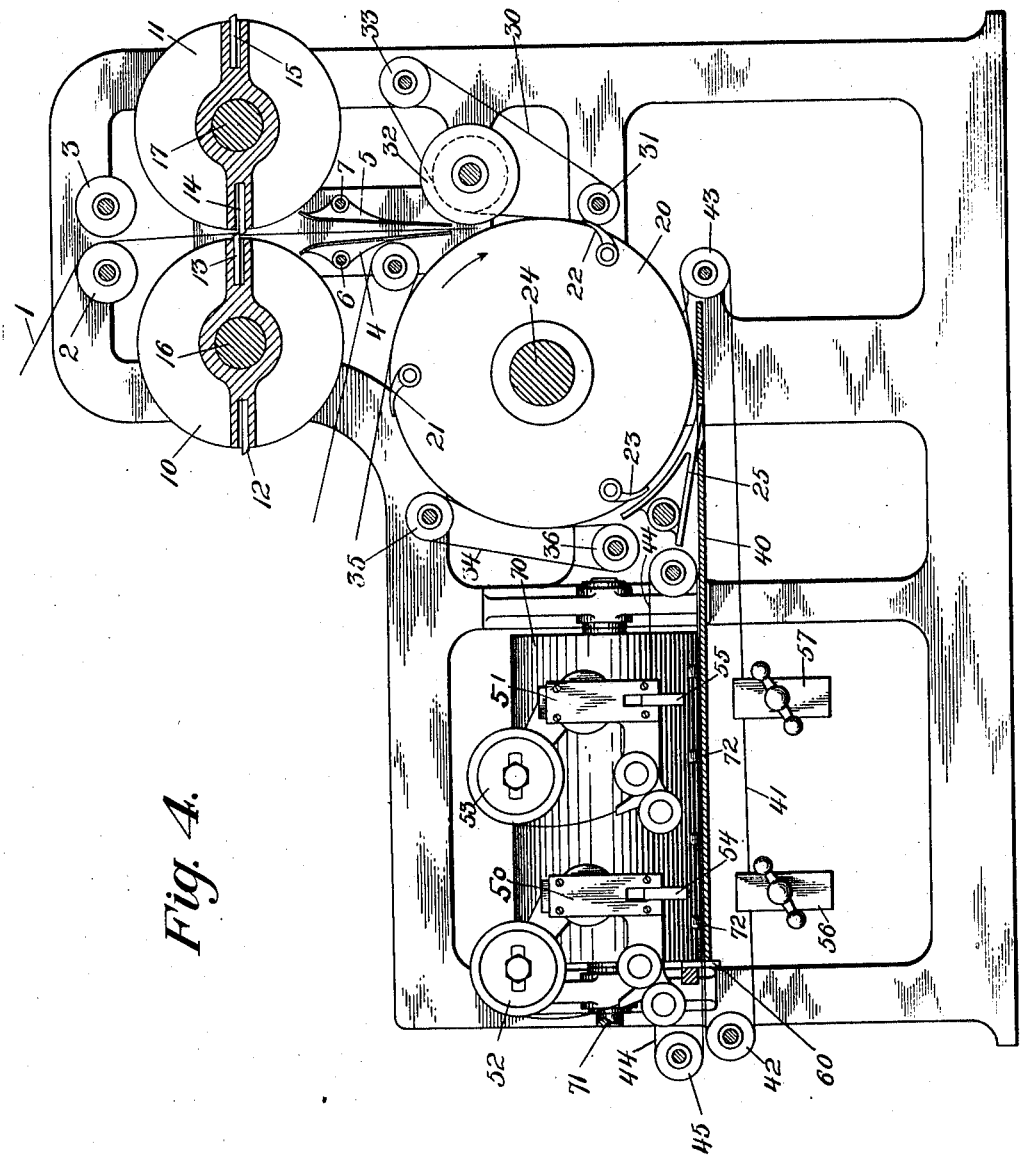

Of the drawings: Figure 1 is an elevation of a machine constructed in accordance with the principles of the invention, showing the stitching, folding and trimming mechanisms; Fig. 2 is a partial top plan view corresponding to Fig. 1; Fig. 3 joins Fig. 2 at the left thereof to form the remainder of the top plan of the machine of Fig. 1; Fig. 4 is an elevation looking at Fig. 1 from the right and showing more particularly the sheet cutting, collecting and stitching mechanisms; Fig. 5 is a fragmentary and partly diagrammatic view showing the folded pamphlet or magazine being stopped and registered by its folded edge preparatory to trimming the front edge; Fig. 6 is a similar view to Fig. 5 showing the trimming of the front edge of the pamphlet; and Fig. 7 is also a similar view to Fig. 5 showing the trimmed book or pamphlet being fed forward and another bundle of sheets soon to be folded off to be forwarded to the trimming devices.

Referring to the accompanying drawings, illustrating by way of example one embodiment of the invention, means are provided for associating a plurality of sheets preparatory to stitching, folding and trimming. Such associating means may be of any approved or suitable form, and in the drawings the sheets are shown conveniently derived from a web 1 directed between the rollers 2 and 3 and into a throat consisting of a plurality of guiding fingers 4 and 5, mounted, respectively, upon supporting rods 6 and 7. Suitable devices are provided for severing the web 1 into sheets, and the form thereof illustrated herewith comprises rotary cutters 10 and 11; cutter 10 carrying knives 12 and 13, and cutter 11 carrying knives 14 and 15. Said knives coöperate in pairs to sever the web into sheets.

A plurality of webs may be associated and run into the machine together, if desired, or the sheets may be associated in some other way. In the illustrated form, the cut off sheets are taken by a three-way collecting cylinder 20 provided with three sets of sheet grippers numbered respectively 21, 22 and 23. Each set of these grippers takes and associates successive sheets, and when the bundle or stack of sheets is complete, the gripper opens to release it. The stripping blades 25 assist in stripping the sheets from the cylinder. A series of tapes 30 running over the rollers 31, 32 and 33 are shown for bringing the successively fed and cut off sheets nicely onto the surface of the cylinder 20, so that they may be certainly and accurately taken by the grippers thereon. A series of tapes 34 are likewise shown running upon rollers 35 and 36 to keep the sheets lying close and smoothed out upon the surface of the cylinder as they rotate therewith. Such mechanisms are old in the art, and the particular form thereof is immaterial, so far as concerns many features of the present invention.

As the sheets, associated together in a bundle or stack, leave the cylinder 20 they are progressed along a path 40 by tapes 41 running over rollers 42 and 43 and corresponding tapes 44 working over rollers 45 and 46. Adjacent to the path of travel of the sheets, means are provided for binding the associated sheets together, and the illustrated form of such means comprises two wire stitchers 50 and 51 arranged longitudinally of the path of travel of the sheets. Said wire stitchers have reels 52 and 53, respectively, feeding the wire to the reciprocating plungers 54 and 55, on the respective stitchers, which coöperate with anvils 56 and 57 to stitch the sheets together. Suitable means for supporting and actuating the stitchers will be provided, and various forms of such means are old in the art. Such supporting and operating means are therefore omitted from the drawings for the sake of clearness in showing other parts.

Means are provided for registering and stopping the sheets in position for stitching, and for this purpose there is shown a gage or stop 60 extending across the path of travel of the sheets, said gage consisting of a number of fingers or projections.

Means for folding the stitched sheets are provided, which may be of any suitable or convenient form so far as concerns certain features of the invention. In the illustrated form of folding means, a cylinder, or equivalent device 70 is shown located at one side of the path 40, and of the stitchers 50 and 51. Said cylinder is carried by a shaft 71, suitably journaled on the machine frame, and disposed substantially parallel to the path of travel of the sheets up to the stop 60. Said cylinder is provided with sheet conveying and folding devices and the form of such means shown herein comprises a set of sheet taking grippers 72 and a tucking blade 73. The grippers 72 will be provided with suitable actuating means of convenient and approved form to open and close them to take and release the sheets at the proper times and in the proper position. The tucking blade 73 will likewise be provided with suitable actuating means of suitable and approved form. In the present embodiment means are provided for giving the stitched sheet bundle a slight movement into the grippers 72. Said means comprise fingers 80 fixed on rock shaft 81. Arms 82 are likewise fixed to said shaft and links 83 are pivotally connected to said arms and to suitable actuating means (not shown).

The folded pamphlet has its edge opposite the fold, that is, the edge formed by bringing together the opposite edges of the sheets when they are folded centrally and parallel to said edges, trimmed to remove the outwardly convex edge due to a relatively large number of sheets of the same size being folded one within the other, and to cut said edge off perpendicularly to the sides of the pamphlet in order to give the pamphlet a neat and attractive appearance. In accordance with one feature of the invention, the pamphlet is positioned or registered by its back, that is, its folded edge, to make the trimmed edge parallel to said back or folded edge.

The embodied form of trimming means and associated mechanism comprises a suitable support 85. A gage or stop 86 is arranged to be projected into the path of the pamphlet and to be withdrawn therefrom. Said gage 86 is mounted on rods 87 working, respectively, in lugs 88 and 89 on the machine frame. A cam roll 90 is carried in the end of each of said rods 87, said cam roll coöperating with a cam 91 on a shaft 92. The cam roll is held to its cam by a spring 93 working between a lug 88 and a collar 94 on the rod 87.

Means for clamping the edge to be trimmed are provided, and in the embodied form a stationary clamping block 96 is provided below the path of travel of the pamphlets, and a movable clamping block 97 thereabove. Said block 97 is slidable in guides 98 in the machine frame. The embodied form of trimming means comprises a reciprocating knife 99 working in guides 100 on the machine frame, the edge of the clamping block 96 coacting as a cutting edge therewith.

In the illustrated embodiment combined actuating means for the clamping and cutting devices are provided, affording also a springing or yielding action for the clamp. The reciprocating knife 99 is connected by pivoted links 101 to levers 102, which levers are pivoted to the machine frame at 103. A spring or springs 104 act on the levers 102. Cams 105 on shaft 106 coöperate with cam rolls 107 on the respective levers 102. The reciprocable clamp 97 has portions 108 extending therefrom provided with slots 109. Blocks 110 are slidably mounted in slots 109 and have pin and slot connection with the respective levers 102. Springs 111 press said blocks 110 to the top of the slots 109. When the levers 102 are pressed downwardly against spring 104 by cams 105, knife 99 will be positively moved downwardly by means of links 101. Springs 111 will also cause the clamp 97 also to travel down. Clamp 97 will engage and clamp the pamphlet at its edge with a strong spring pressure which readily accommodates itself to pamphlets of different thicknesses. Just after the clamping, the knife 99 trims the edge. The whole is then retracted by spring 104.

Means for progressing the pamphlets are provided and as embodied act on the pamphlet before and after trimming. The embodied form of such means comprises tapes 115 running over rollers 116 beneath the path of the pamphlet and drop rollers 117 carrying tapes 118 above said path. As embodied the drop rollers 117 are constructed and arranged to move in harmony with the clamping and trimming devices. Said drop rollers are mounted on arms 119 which have yielding spring connections with a shaft 120. Fixed to said shaft 120 are arms 121 having pin and slot connection with the extensions 108 of the clamp 97.

The manner of operation of the hereinbefore described mechanism is substantially as follows:—The web 1 is run down between the rollers 2 and 3 and through the throat formed by the guides 4 and 5 and is pressed by the tapes 30 against the surface of the cylinder 20. One set of collecting grippers on the cylinder 20 takes the end of the sheet while the rotary cutters 10 and 11 sever it at the other end. The next succeeding sheet is taken in a similar manner by another series of grippers on said cylinder 20 and the next sheet by the third series of said grippers. As the sheets come down in one, two, three, four order, and there are but three sets of the collecting grippers on the cylinder 20, the sheets are thus associated in bundles of one, two, three, four (referred to the order of their coming down, mentioned above) by each series or set of the grippers. The grippers then let the completed bundle go, and the strippers 25 are caused to strip them from the cylinder and insure their passing away along the path 40 to the stitchers. The sheets then progress along the path 40 under the action of the tapes and are stopped and registered by the gages 60, and at the same instant the stitchers 51 and 52 stitch the bundle of sheets together. Just as this operation is completed the grippers 72 grip the side edge of the bundle $x$ of the now stitched sheets, Fig. 5 the arms 80 giving the sheet bundle a slight movement into the grippers, and they are carried off around the cylinder 70. As they come around into position relatively to the folding rolls 74 and 75 the tucking blade 73 tucks them between the folding rollers.

As the folded pamphlet is fed forward through the folding rollers 74 and 75, the tapes 115 and 118 and their rollers feed it forward. It is stopped and registered by gage 86, and the drop rollers 117 lift away from the pamphlet, taking also tapes 118, as the clamp 97 and knife 99 pass into action as already described. As the clamp 97 and knife 99 recede after the trimming operation and the gage 86 drops out of the path, the drop rollers 117 and tapes 118 pass again into engagement with the trimmed magazine and feed it forward.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent is:

1. A book or pamphlet making machine including in combination means for stitching together a plurality of sheets, means for folding said sheets along the line of the stitching, and means for trimming the folded-together edge opposite the stitching.

2. A book or pamphlet making machine including in combination means for stitching together a plurality of sheets, means for folding said sheets along the line of the stitching, means for clamping the edge opposite the stitching, and means for cutting said edge parallel to said folded edge.

3. A book or pamphlet making machine including in combination means for stitching together a plurality of sheets at a plurality of points in line with each other, means for folding said sheets together along the line of stitches, and means for trimming the edge opposite to the fold parallel to the fold.

4. A book or pamphlet making machine including in combination means for stitching together a plurality of sheets, means for folding said sheets along the line of the stitching, a stop, means for feeding the folded pamphlet thereto and registering said folded edge against said stop, and means for trimming the edge opposite the fold parallel to the fold.

5. A book or pamphlet making machine including in combination means for stitching together a plurality of sheets, means for folding said sheets along the line of the stitching, a stop, means for feeding the folded pamphlet thereto and registering said folded edge against said stop, means for clamping the edge opposite the fold, and means for trimming said clamped edge parallel to said fold.

6. A book or pamphlet making machine including in combination means for stitching together a plurality of sheets, means for folding said sheets along the line of the stitching, a stop, means for feeding the folded pamphlet thereto and registering said folded edge against said stop, means for clamping the edge opposite the fold, means for trimming said clamped edge parallel to said fold, means for unclamping the trimmed pamphlet, and means for feeding it off.

7. A book or pamphlet making machine including in combination devices for associating a plurality of sheets and feeding them flat to stitching devices, stitching devices for putting a line of stitches in the flat sheets, means for folding said sheets along the line of the stitches, and means for trimming the edges of the folded sheets which are opposite and parallel to said fold.

In testimony whereof, I have signed my name to this specification, in the presence of two subscribing witnesses.

JOHN D. MORGAN.

Witnesses:
ALAN M. JOHNSON,
ROSE MENK.